US012061445B2

(12) United States Patent
Favez et al.

(10) Patent No.: US 12,061,445 B2
(45) Date of Patent: Aug. 13, 2024

(54) STRENGTHENED TIMEPIECE COMPONENT

(71) Applicant: ROLEX SA, Geneva (CH)

(72) Inventors: Denis Favez, Grand-Saconnex (CH); Stephano Henin, Saint-Prex (CH)

(73) Assignee: ROLEX SA, Geneva (CH)

( * ) Notice: Subject to any disclaimer, the term of this patent is extended or adjusted under 35 U.S.C. 154(b) by 836 days.

(21) Appl. No.: 16/715,011

(22) Filed: Dec. 16, 2019

(65) Prior Publication Data

US 2020/0192300 A1 Jun. 18, 2020

(30) Foreign Application Priority Data

Dec. 18, 2018 (EP) .................................... 18213618

(51) Int. Cl.

| | |
|---|---|
| ***G04D 3/00*** | (2006.01) |
| ***C23F 1/02*** | (2006.01) |
| ***G04B 13/02*** | (2006.01) |
| ***G04B 15/14*** | (2006.01) |
| ***G04B 19/04*** | (2006.01) |

(52) U.S. Cl.

CPC ............. *G04D 3/0069* (2013.01); *C23F 1/02* (2013.01); *G04B 13/02* (2013.01); *G04B 15/14* (2013.01); *G04B 19/042* (2013.01)

(58) Field of Classification Search

CPC ......... G04D 3/0069; C23F 1/02; G04B 13/02; G04B 15/14; G04B 19/042

See application file for complete search history.

(56) References Cited

U.S. PATENT DOCUMENTS

| | | | | |
|---|---|---|---|---|
| 9,250,610 | B2 | 2/2016 | Daout | |
| 9,411,314 | B2 | 8/2016 | Daout et al. | |
| 2010/0149927 | A1 | 6/2010 | Zaugg et al. | |
| 2010/0214880 | A1 | 8/2010 | Rappo et al. | |
| 2013/0029157 | A1 | 1/2013 | Karapatis | |
| 2013/0047437 | A1 | 2/2013 | Daout | |
| 2015/0023140 | A1 | 1/2015 | Daout et al. | |
| 2015/0309474 | A1* | 10/2015 | Bossart ................ | G04B 31/004 216/87 |

(Continued)

FOREIGN PATENT DOCUMENTS

| | | | | |
|---|---|---|---|---|
| CH | 702431 | A2 * | 6/2011 | ......... B81C 1/00674 |
| CH | 702431 | A2 | 6/2011 | |

(Continued)

OTHER PUBLICATIONS

Leee et al., "Silicon Profile Transformation and Sidewall Roughness Reduction Using Hydrogen Annealing", IEEE 2005, pp. 596-599 (in English; cited in the specification).

(Continued)

*Primary Examiner* — Edwin A. Leon
*Assistant Examiner* — Kevin Andrew Johnston
(74) *Attorney, Agent, or Firm* — Seckel IP, PLLC

(57) ABSTRACT

Timepiece component based on a micromachinable material, including at least one micromachinable-material surface portion that is smoothed at least by hydrogen smoothing. The at least one micromachinable-material surface portion includes an oxide layer of thickness larger than 1 micron in order to increase its mechanical strength. In a particular embodiment the micromachinable material can be silicon and the oxide layer silicon oxide.

25 Claims, 3 Drawing Sheets

(56) References Cited

U.S. PATENT DOCUMENTS

| | | | | |
|---|---|---|---|---|
| 2017/0285573 | A1* | 10/2017 | Manousos | G04B 19/12 |
| 2018/0173165 | A1* | 6/2018 | Fussinger | G04B 13/026 |

FOREIGN PATENT DOCUMENTS

| | | | | | |
|---|---|---|---|---|---|
| CH | 703445 | B1 * | 1/2012 | | B81C 1/00674 |
| CH | 707986 | A2 | 10/2014 | | |
| CN | 102471047 | A | 5/2012 | | |
| CN | 103645622 | A | 3/2014 | | |
| CN | 105000530 | A | 10/2015 | | |
| EP | 1904901 | | 4/2008 | | |
| EP | 2277822 | A1 | 1/2011 | | |
| EP | 2456714 | A0 | 5/2012 | | |
| EP | 2937311 | A1 | 10/2015 | | |
| EP | 3339968 | A1 * | 6/2018 | | G04B 1/16 |
| FR | 2136037 | A5 | 12/1972 | | |
| GB | 1351062 | A | 4/1974 | | |
| WO | 2007000271 | A1 | 1/2007 | | |
| WO | 2011009869 | A1 | 1/2011 | | |
| WO | 2011116486 | A1 | 9/2011 | | |
| WO | 2013045706 | A2 | 4/2013 | | |
| WO | 2015113973 | A1 | 8/2015 | | |
| WO | WO-2015113973 | A1 * | 8/2015 | | G04B 17/066 |

OTHER PUBLICATIONS

Chinese Ofice Action and Search Report dated Jun. 2, 2022 in counterpart application No. CN201911308119; w/ English machine translation (total 18 pages).

* cited by examiner

STRENGTHENED TIMEPIECE COMPONENT

This application claims priority of European patent application No. EP18213618.4 filed Dec. 18, 2018, the content of which is hereby incorporated by reference herein in its entirety.

The invention relates to a process for manufacturing a timepiece component from a micromachinable material, silicon for example. It also relates to a timepiece component, and to a timepiece movement and to a timepiece comprising such a timepiece component.

Silicon is a material that has multiple advantages for the manufacture of timepiece components. On the one hand it allows simultaneous manufacture of a high number of parts of small size, with a micrometric precision. On the other hand, it has a low density and a diamagnetic character. This material however has a drawback: it possesses no, or hardly any, domain of plastic deformation, this making it a material that exhibits fragile behavior. A mechanical stress or shock may thus lead to a breakage of the component without prior deformation. Handling timepiece components made of silicon, in particular during their manufacture and the assembly thereof, is therefore particularly tricky.

The fragility of timepiece components made of silicon is accentuated by the way in which they are cut from a silicon substrate, i.e. generally using a deep etching technique, for example deep reactive-ion etching (DRIE). One specificity of this type of etching process is that it forms openings having slightly wrinkled sidewalls that have, on their surfaces, defects (called scallops) that look like small waves or small bite marks. As a result the etched sidewalls have a certain roughness, which decreases the mechanical strength of the component. Furthermore, these defects present on the surface of the sidewalls may generate crack ignition sites, in particular in the case of mechanical stress, and lead to breakage of the component under stresses lower than the usual strength of the material.

To improve the mechanical properties of timepiece components made of silicon, a plurality of approaches have already been proposed.

A first approach, described in document EP1904901, consists in forming a silicon-oxide layer by thermal oxidation of the silicon at a temperature comprised between 900° C. and 1200° C. The formed oxide layer results from a conversion of the silicon on the surface of the component into silicon oxide. This document specifies that this layer is at least 5 nm in thickness and in practice remains strictly smaller than 1 micron in thickness.

Document EP2277822 describes a variant of this first approach, in which the formed oxide layer is then dissolved. The formation of the silicon-oxide layer then its dissolution allows the layer on the surface of the silicon containing some of the defects and/or crack ignition sites to be removed and asperities to be rounded. This solution finally consists in smoothing the surface of the silicon using a so-called oxidizing-deoxidizing process.

These two solutions, which apply the first approach to achieve the oxidation, have the drawback of consuming silicon and of modifying the initial dimensions of the unfinished silicon timepiece component.

A second approach, which is described in document "Silicon Profile Transformation and Sidewall Roughness Reduction Using Hydrogen Annealing" by Lee et al. (IEEE, 2005), is based on a solution involving smoothing sidewalls of silicon components in a field bearing almost no relation to watch and clock making by means of hydrogen annealing. The migration of silicon is promoted by hydrogen and temperature, and allows sidewall surface defects to be smoothed without consuming silicon, and therefore without affecting the initial dimensions of the component. The effectiveness of such an approach is however debatable and it was above all developed with the aim of forming rounded/spherical three-dimensional structures in silicon.

This solution has been applied to the field of watch and clock making with the aim of rounding sharp edges of parts cut from various materials, as described in document CH702431.

The present invention proposes an improved solution for strengthening a timepiece component made of a micromachinable material, silicon for example.

Specifically, one subject of the invention is a process for manufacturing a timepiece component, in which a part forming an unfinished timepiece component is produced from a micromachinable material, wherein it comprises a smoothing step comprising hydrogen smoothing at least once at least one portion of the surface of the part, and wherein it comprises a step of forming, on said at least one portion of the surface of the part, an oxide layer of thickness larger than 1 micron, or even larger than or equal to 2 microns, or even larger than or equal to 2.5 microns, or even larger than or equal to 3 microns, in order to strengthen the timepiece component.

The invention also relates to a timepiece component as such obtained using such a process.

The invention is precisely defined by the claims.

The invention will be better understood from the following description of one particular embodiment of a process for manufacturing a timepiece component, which is given nonlimitingly with reference to the appended figures, in which.

The concept of the invention consists in strengthening a timepiece component made of a micromachinable material using a thick oxide layer, i.e. one in particular having a thickness clearly larger than the thicknesses chosen in prior-art solutions, in combination with smoothing of the component. Existing solutions for strengthening a component made of silicon using an oxide layer in practice apply an oxide thickness strictly smaller than 1 μm. The obtainment of such a thickness of oxide is time-consuming, typically requiring one night of processing, and leads to a modification of the dimensions of the component.

Figure 1:
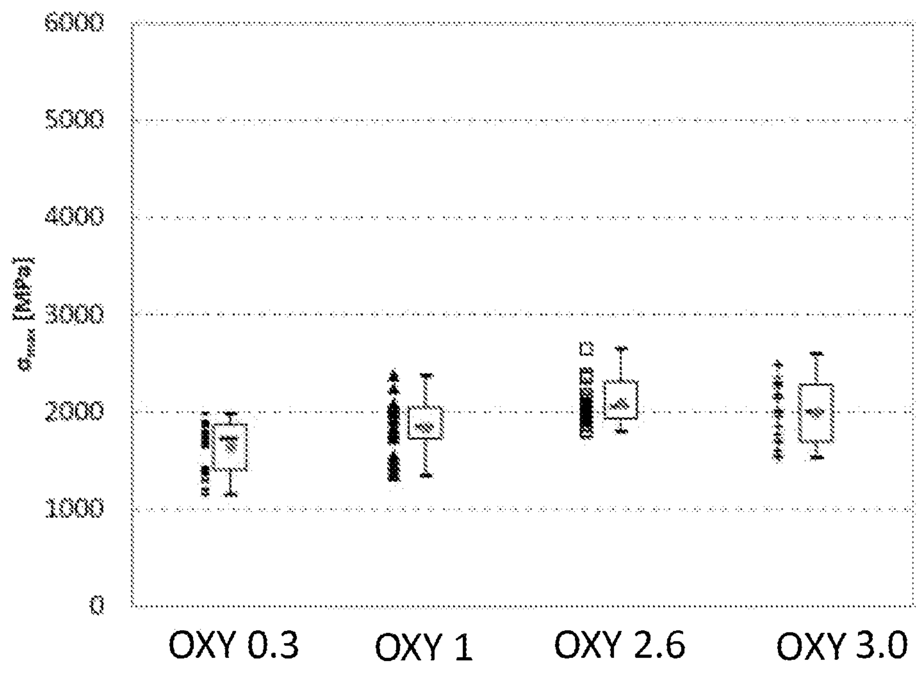
FIG. 1 shows the strength obtained in various batches of timepiece components for a plurality of thicknesses of coating with an oxide layer.

Comparative trials consisting in varying the thickness of the oxide layer, in particular beyond the limit of 1 μm, have been carried out on three-point-bending samples. It will be noted that, because of the fragile character of the material, the same strengthening processing operations lead to results that differ from one timepiece component to another, even though they are in principle identical and subjected to the same stresses. For this reason, it is necessary to carry out tests on batches of identical components, then to perform a statistical analysis thereof in order to observe any effect. FIG. 1 shows the results obtained for four batches with an oxide thickness equal to 0.3 μm, 1 μm, 2.6 μm and 3 μm, respectively. The strength at break of each component of each batch was measured. It may be seen that the mean strength at break increased very slightly with the increase in thickness up to the thickness of 2.6 μm, then stabilized at about 2000 MPa, there being no improvement at the larger thickness of 3 μm. The small improvement in the strength at break with respect to the large increase in the processing time required to increase the thickness of the oxide layer in the end means that this approach is of almost no interest. In other words, the effect of large thicknesses is very inefficient, given the time required to produce these large thicknesses and the large thickness of material impacted.

For these reasons, it has never been imagined to employ an oxide thickness larger than 1 μm. This first prejudice has been overcome by the invention, the choice of which, to combine significantly increased thicknesses with a prior smoothing step, details of which will be given below, has allowed unexpected strengthening of timepiece components to be achieved. Smoothing has never been combined with formation of an oxide layer in the context of mechanical strengthening of a component, these two solutions being considered to be equivalent alternatives. This second prejudice has likewise been overcome by the invention, which has allowed a large improvement, achieved by combining smoothing with an oxide layer, to be demonstrated.

The process for manufacturing a timepiece component according to the invention comprises a first phase of manufacturing an unfinished timepiece component in a known way. For example, this phase may comprise an initial step consisting in providing a substrate made of micromachinable material. This substrate is for example a silicon wafer. In a following step, the wafer, and in particular at least one of the two sides thereof (i.e. at least one of the front side and the back side) is or are covered with a protective coating, a photoresist for example. The process continues with a step of forming a pattern in the protective coating. The pattern is produced by creating openings through the layer of photoresist. The protective coating containing openings forms a protective mask. A step of etching the silicon wafer through the protective mask, in particular by deep reactive-ion etching (DRIE), then allows openings to be etched into the silicon plumb with the one or more openings in the mask, in order to obtain an unfinished silicon timepiece component.

The invention relates to a second phase of strengthening such an unfinished timepiece component, which may moreover as a variant be formed, in the first phase, using any process other than the aforementioned, and for example using a laser cutting technique.

A first experiment consists in performing a step of smoothing the unfinished timepiece component, before forming a thick oxide layer. Such a thick oxide layer is formed on all or some of the surface of the unfinished timepiece component, and preferably on all the surface thereof, or at least 50% or even 75% of the surface thereof. This thick oxide layer may be produced using a process such as described in document EP1904901, or using any other equivalent process. The smoothing step of this experiment comprises an oxidizing and deoxidizing step, for example such as described in document EP2456714. An oxidizing-deoxidizing phase may for example comprise a thermal oxidation at 1100° C. for 2h40, according to the process described in document EP1904901, followed by a dissolution in hydrofluoric acid of the oxide thus formed.

On the basis of this experiment, one advantageous embodiment of the invention adds a hydrogen-smoothing substep to a prior step of smoothing by oxidizing-deoxidizing such as mentioned above, before forming the thick oxide layer in a similar way to that described in the first experiment above. The step of hydrogen smoothing corresponds to hydrogen annealing such as described in document CH702431. It comprises annealing the unfinished timepiece component, or at least its treated surface, in a reducing atmosphere under temperature and pressure conditions chosen to cause the migration of atoms of silicon from sharp edges, so as to round them. In one embodiment, this hydrogen smoothing step is carried out at a temperature comprised between 600° C. and 1300° C. and at a pressure strictly higher than 100 torr. It will be noted that hydrogen smoothing moves silicon atoms as mentioned above: by observing edges, it may be seen that the hydrogen smoothing causes a sort of swelling about the edge, this having the indirect effect of rounding them.

Finally, it will be clear that other embodiments may be employed, comprising any intermediate surface smoothing step comprising at least one hydrogen-smoothing step before a thick oxide layer is formed.

In all these embodiments, the thick oxide layer has a thickness that is preferably larger than 1 μm, or even larger than or equal to 1.5 μm or to 2 μm or to 2.5 μm or to 3 μm or to 3.2 μm. The thickness of the oxide layer is advantageously smaller than or equal to 5 μm. This oxide layer advantageously has a constant thickness. As a variant, it may have a variable thickness. In this case, the preceding values apply to the mean thickness, or to the median thickness. In addition, in the described embodiments, the thick oxide layer was obtained using a process such as described in document EP1904901, but it may as a variant be obtained using any other process.

In order to demonstrate the advantage of the process for manufacturing a strengthened timepiece component according to the embodiments of the invention, which are described below, comparative trials have been carried out on three-point-bending samples. It will be noted, because of the fragile character of the material, the same strengthening processing operations lead to results that differ from one timepiece component to another, even though they are in principle identical and subjected to the same stresses. For this reason, it is necessary to carry out tests on batches of identical components, then to perform a statistical analysis thereof in order to observe any effect.

Figure 2:
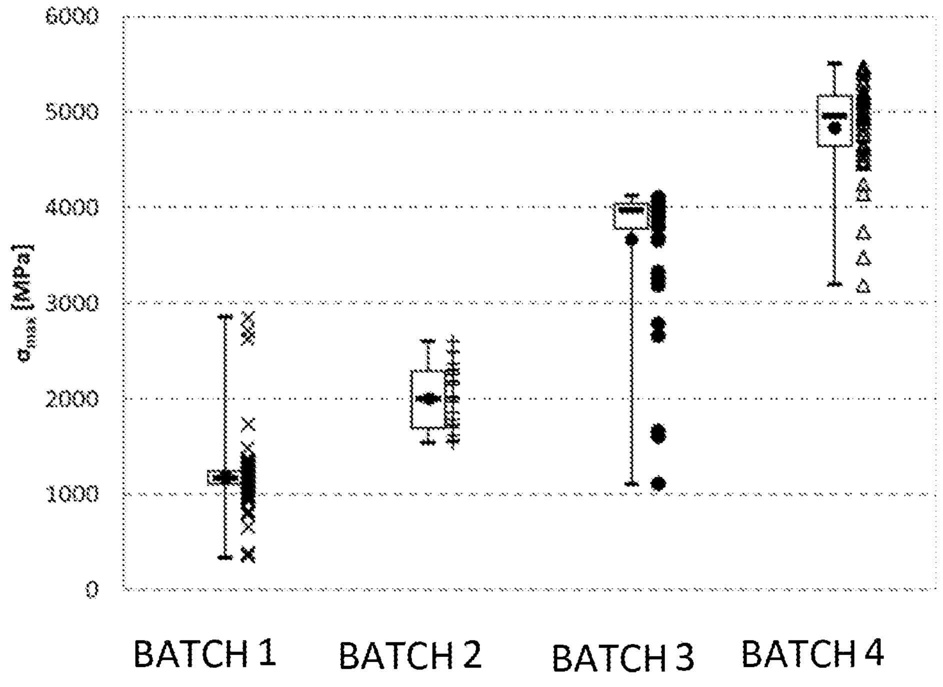
FIG. 2 shows the strength obtained in various batches of timepiece components, demonstrating the positive results obtained by implementing one embodiment of the invention.

FIG. 2 shows the strength at break of each part of each batch, this allowing the amplitude of the results to be seen for each batch. For each of these batches, it is particularly advantageous to observe the minimum strength at break, and the mean strength at break.

A first batch (batch 1) of parts was a reference batch, to which the invention was not applied. This batch comprised parts made of silicon formed using the DRIE process with a first tool, with no post-processing. The mean strength at break was low and the risk of premature breakage of a component was high, because of the measured minimum stress at break lower than 500 MPa.

The second batch (batch 2) was a batch that comprised silicon parts that were similar to batch 1, and that were produced by etching using the DRIE process with a second tool, but that underwent strengthening processing in which an oxide layer of three-microns thickness was grown without smoothing. This second batch was an intermediate experiment forming a stepping stone to the invention, and which had the advantage of a thick oxide layer. It may be seen that the mean strength at break of this second batch was higher, about 2000 MPa, and that the minimum stress at break was above 1500 MPa.

The third batch (batch 3) comprised silicon parts that were similar to batch 1, and that were produced by etching using the DRIE process with a first tool, but that underwent strengthening processing in which an intermediate step of smoothing by oxidizing-deoxidizing (growth of 1 micron of oxide—HF dissolution) was carried out before growth of an oxide layer of 2.87 microns thickness. This third batch corresponded to the first experiment mentioned above, which in the end is another intermediate experiment forming a stepping stone to the invention. The mean strength at break was further increased (4000 MPa) with respect to batch 2.

The fourth batch (batch 4) comprised silicon parts that were similar to batch 1, and that were produced by etching using the DRIE process with a first tool, but that underwent strengthening processing in which an intermediate step of smoothing by oxidizing-deoxidizing (growth of 1 micron of oxide—HF dissolution) then a hydrogen smoothing step were carried out before growth of an oxide layer of 2.87 microns thickness. This fourth batch employed the advantageous embodiment of the invention described above. Performance was here clearly improved with respect to the other batches, both with regard to mean stress at break (which was about 5000 MPa) and with regard to the minimum stress at break of the batch (which was higher than 3000 MPa). Various types of defects were eradicated by the combination of the various smoothing operations, and the final, very thick, oxide layer contributed to plugging and smoothing the last defects present.

FIG. 2 therefore clearly illustrates the surprising advantageous effects obtained by implementing a process according to the invention.

As a variant (not illustrated) it will be noted that satisfactory results may be obtained by solely implementing a hydrogen smoothing step followed by growth of a thick oxide layer.

It will be noted that the invention may be combined with other known processes, which also contribute to the improvement in the performance of such a timepiece component. Thus, a process for mechanically strengthening the part using an isotropic fluid etchant, a process such as described in document EP2937311 for example, may be employed.

Furthermore, the oxide layer according to the invention may optionally be covered with any other coating of small thickness in order to further improve strength or to provide the timepiece component with another property, such as a different tribology. Thus, the thick oxide layer of the invention is a surface layer in that it is positioned in proximity to the surface of the component, but it is not necessarily the outermost layer of the component.

It will be noted that, in the examples described above, the timepiece component therefore comprises a base made of silicon covered with a thick oxide layer, which is made of silicon dioxide. As a variant, any other process for depositing an oxide layer, potentially an oxide layer other than the silicon-oxide layer described here, could be used. As a variant, a layer of silicon carbide or nitride could be deposited. As yet another variant, a layer of titanium nitride or carbide could be deposited. Finally, any thick layer could be used, providing that it allows residual surface defects of the part to be plugged. According to another variant, a plurality of superposed layers (optionally made of different materials) chosen from among the aforementioned layers, could be used.

The process of the invention therefore allows timepiece components made of a micromachinable material and having strengthened mechanical properties to be manufactured. In the examples described above, the micromachinable material is silicon. As a variant, a substrate made of quartz, of diamond or of any other micromachinable material suitable for the manufacture of a timepiece component could be used. In this case, the smoothing and strengthening processes must be adapted to each of these materials.

Furthermore, the process of the invention is suitable for manufacturing any timepiece component, in particular a timepiece component comprising flexible portions in order to allow the assembly thereof. By way of illustrative and nonlimiting examples, the timepiece components may be toothed wheels, escapement wheels, any escapement component, hands, impulse pins, pallets and levers or other timepiece springs, such as a mainspring or an oscillator balance spring.

Figure 3:
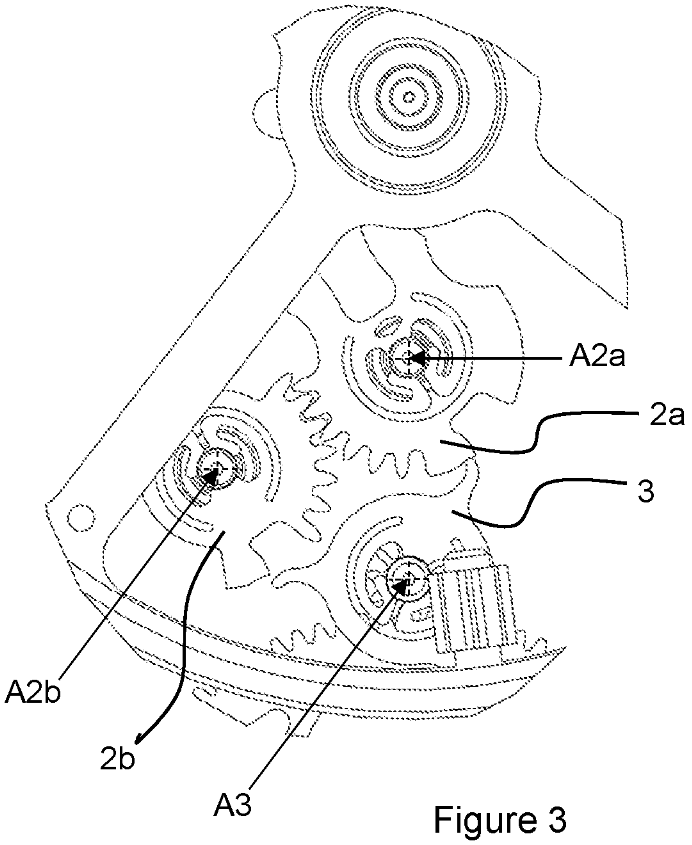
FIG. 3 shows a device for governing a timepiece movement seen from above, comprising timepiece components according to one embodiment of the invention.
Figure 4:
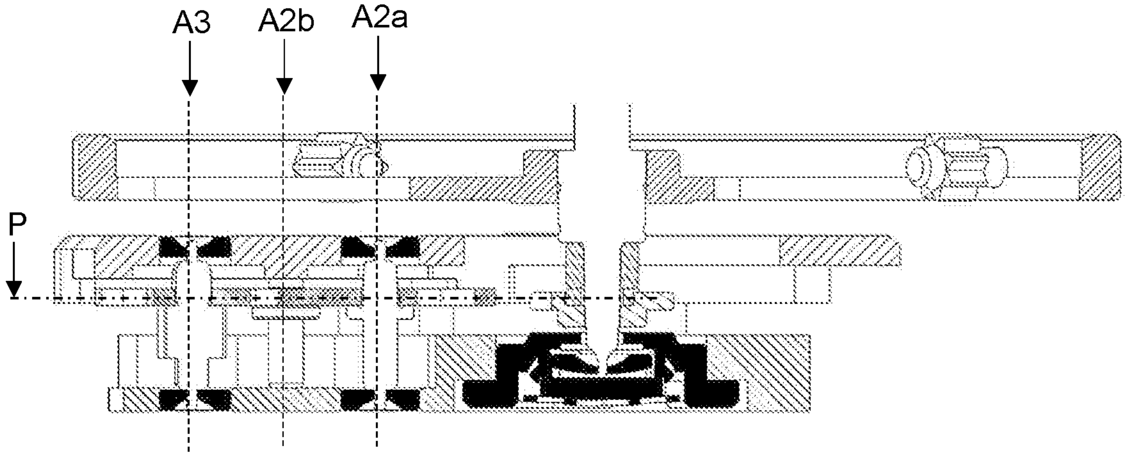
FIG. 4 shows the device for regulating a timepiece movement in cross section.
Figure 5:
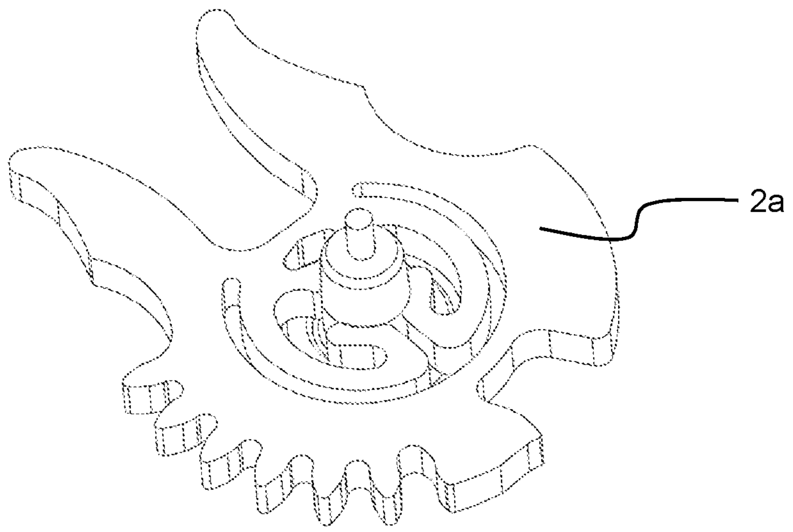
FIG. 5 shows a moving part of a brake-lever of the governing device according to one embodiment of the invention.

For example, the process may be adapted to the production of components of a governing device. Such a governing device is illustrated in FIGS. 3 to 5. In particular, it notably comprises an escapement wheel 3 that pivots about an axis A3 and a brake-lever 2 comprising a first brake-lever moving part 2*a* that pivots about a third axle A2*a* and a second brake-lever moving part 2*b* that pivots about a fourth axle A2*b*, all three being placed in the same plane P and made of silicon.

Such components, because of their particularly small dimensions and the intrinsically fragile character of the material used, prove to be tricky to assemble. The risk of breakage at the moment that these components are driven onto their axle is high. Thus, preferably, the components 2*a*, 2*b* and 3 each comprise a central opening delineated by elastic arms the ends of which are intended to interact with their respective axle. The dimensions of the elastic arms are defined so as to ensure a sufficient torque holds the components 2*a*, 2*b*, 3 in place on each of their respective axles A2*a*, A2*b*, A3. Preferably, the outline of the central opening is noncircular, just like the opening of elastic collets such as described in document WO2011/116486 or in document WO2013/045706.

Because of the small dimensions of the arms, it is necessary to maximize the mechanical strength of the material and the process of the invention allows the risk of breakage related to the minimum stress at break of the batch to be decreased.

The invention also relates to a timepiece component manufactured using the manufacturing process that has just been described, and to a timepiece incorporating this timepiece component.

The timepiece component based on a micromachinable material will therefore be characterized in that at least some of its surface will have undergone hydrogen smoothing and will comprise an oxide layer of a thickness larger than or equal to 1 or even 2 or even 3 microns in order to increase its mechanical strength, or indeed of a thickness other than those listed above.

Advantageously, the timepiece component is characterized in that it has a mean strength at break higher than or equal to 4000 MPa, and/or in that it has a minimum strength at break higher than or equal to 3000 MPa.

Advantageously, the invention is applicable to timepiece components that may be said to be rigid, i.e. the operation of which does not require or hardly requires the property of elasticity, in contrast for example to springs (excluding in particular mainsprings and balance springs). These rigid components may have elastic portions useful for the assembly thereof such as described above, but not used subsequently in their timekeeping function. In other words, such timepiece components are not intended to deform elastically to store and release energy during their operation. With such components, strength at break is particularly important and required since they cannot, for example, elastically damp any stresses to which they are subjected since they are not designed to exploit an elasticity.

The invention claimed is:

1. A process for manufacturing a timepiece component, comprising:

producing a part forming an unfinished timepiece component from a micromachinable material, performing smoothing comprising at least hydrogen smoothing of at least one portion of the surface of the part, and mechanically strengthening the part by forming, on the at least one portion of the surface of the part an oxide layer having a thickness larger than 1 micron, wherein (i) the timepiece component has a mean strength higher than or equal to 4000 MPa, and/or (ii) the timepiece component has a minimum strength higher than or equal to 3000 MPa.

2. The process for manufacturing a timepiece component as claimed in claim 1, wherein the producing the part forming an unfinished timepiece component comprises micro-machining the part.

3. The process for manufacturing a timepiece component as claimed in claim 1, wherein the smoothing of the at least one portion of the surface of the part comprises, prior to hydrogen smoothing, additional smoothing by oxidizing-deoxidizing.

4. The process for manufacturing a timepiece component as claimed in claim 1, wherein the process comprises a processing action for mechanically strengthening the part using an isotropic fluid etchant.

5. The process for manufacturing a timepiece component as claimed in claim 2, wherein the smoothing of the at least one portion of the surface of the part comprises, prior to hydrogen smoothing, additional smoothing by oxidizing-deoxidizing.

6. The process for manufacturing a timepiece component as claimed in claim 2, wherein the process comprises a processing action for mechanically strengthening the part using an isotropic fluid etchant.

7. The process for manufacturing a timepiece component as claimed in claim 3, wherein the process comprises a processing action for mechanically strengthening the part using an isotropic fluid etchant.

8. The process for manufacturing a timepiece component as claimed in claim 1, wherein the oxide layer has a thickness larger than or equal to 2 microns.

9. The process for manufacturing a timepiece component as claimed in claim 1, wherein the micromachinable material is silicon and the oxide layer is silicon oxide.

10. The process for manufacturing a timepiece component as claimed in claim 1, wherein the timepiece component is made of silicon and is a component of an escapement device.

11. The process for manufacturing a timepiece component as claimed in claim 1, wherein (i) the timepiece component is rigid and does not release energy by elasticity and/or (ii) the timepiece component is selected from the group consisting of a toothed wheel, an escapement wheel, a hand, an impulse pin and a pallet.

12. The process for manufacturing a timepiece component as claimed in claim 5, wherein the process comprises a processing action for mechanically strengthening the part using an isotropic fluid etchant.

13. The process for manufacturing a timepiece component as claimed in claim 1, wherein the producing the part forming an unfinished timepiece component comprises micro-machining the part by deep reactive-ion etching (DRIE).

14. The process for manufacturing a timepiece component as claimed in claim 1, wherein the producing the part forming an unfinished timepiece component comprises micro-machining the part by a laser cutting technique.

15. The process for manufacturing a timepiece component as claimed in claim 13, wherein the smoothing of the at least one portion of the surface of the part comprises, prior to hydrogen smoothing, additional smoothing by oxidizing-deoxidizing.

16. The process for manufacturing a timepiece component as claimed in claim 13, wherein the process comprises a processing action for mechanically strengthening the part using an isotropic fluid etchant.

17. The process for manufacturing a timepiece component as claimed in claim 14, wherein the smoothing of the at least one portion of the surface of the part comprises, prior to hydrogen smoothing, additional smoothing by oxidizing-deoxidizing.

18. The process for manufacturing a timepiece component as claimed in claim 14, wherein the process comprises a processing action for mechanically strengthening the part using an isotropic fluid etchant.

19. The process for manufacturing a timepiece component as claimed in claim 15, wherein the process comprises a processing action for mechanically strengthening the part using an isotropic fluid etchant.

20. A process for manufacturing a timepiece component, comprising:

producing a part forming an unfinished timepiece component from a micromachinable material, performing smoothing comprising at least hydrogen smoothing of at least one portion of the surface of the part, and mechanically strengthening the part by forming, on the at least one portion of the surface of the part an oxide layer having a thickness larger than 1 micron, wherein the producing the part forming an unfinished timepiece component comprises micro-machining the part by deep reactive-ion etching (DRIE), and wherein (i) the smoothing of the at least one portion of the surface of the part comprises, prior to hydrogen smoothing, additional smoothing by oxidizing-deoxidizing, and/or (ii) the process comprises a processing action for mechanically strengthening the part using an isotropic fluid etchant.

21. The process for manufacturing a timepiece component as claimed in claim 20, wherein the smoothing of the at least one portion of the surface of the part comprises, prior to hydrogen smoothing, additional smoothing by oxidizing-deoxidizing.

22. The process for manufacturing a timepiece component as claimed in claim 20, wherein the process comprises the processing action for mechanically strengthening the part using the isotropic fluid etchant.

23. A process for manufacturing a timepiece component, comprising:

producing a part forming an unfinished timepiece component from a micromachinable material, performing smoothing comprising at least hydrogen smoothing of at least one portion of the surface of the part, and mechanically strengthening the part by forming, on the at least one portion of the surface of the part an oxide layer having a thickness larger than 1 micron, wherein the producing the part forming an unfinished timepiece component comprises micro-machining the part by a laser cutting technique, and wherein (i) the smoothing of the at least one portion of the surface of the part comprises, prior to hydrogen smoothing, additional smoothing by oxidizing-deoxidizing, and/or (ii) the process comprises a processing action for mechanically strengthening the part using an isotropic fluid etchant.

24. The process for manufacturing a timepiece component as claimed in claim 23, wherein the smoothing of the at least one portion of the surface of the part comprises, prior to hydrogen smoothing, additional smoothing by oxidizing-deoxidizing.

25. The process for manufacturing a timepiece component as claimed in claim 23, wherein the process comprises the processing action for mechanically strengthening the part using the isotropic fluid etchant.

* * * * *